US012552535B2

(12) United States Patent
Turk et al.

(10) Patent No.: US 12,552,535 B2
(45) Date of Patent: Feb. 17, 2026

(54) SHIELDING CASE FOR A ROTARY FLARE DISPENSING SYSTEM

(71) Applicant: Tusas-Turk Havacilik Ve Uzay Sanayii Anonim Sirketi, Ankara (AR)

(72) Inventors: Fatih Turk, Ankara (AR); Emrullah Saglar, Ankara (AR)

(73) Assignee: Tusas- Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 18/724,667

(22) PCT Filed: Nov. 9, 2022

(86) PCT No.: PCT/TR2022/051265
§ 371 (c)(1),
(2) Date: Jun. 27, 2024

(87) PCT Pub. No.: WO2023/129007
PCT Pub. Date: Jul. 6, 2023

(65) Prior Publication Data
US 2025/0171147 A1 May 29, 2025

(30) Foreign Application Priority Data
Dec. 27, 2021 (TR) ................ 2021/021202

(51) Int. Cl.
*B64D 7/00* (2006.01)
*B64D 1/02* (2006.01)

(52) U.S. Cl.
CPC ........ *B64D 7/00* (2013.01); *B64D 1/02* (2013.01)

(58) Field of Classification Search
CPC .......... F42B 12/00; F42B 12/36; F42B 12/70; F42B 12/48; F42B 5/145; F42B 5/15;
(Continued)

(56) References Cited

U.S. PATENT DOCUMENTS 4,307,665 A * 12/1981 Block ................ F42B 12/70
342/12
9,134,098 B1 9/2015 Pruett
(Continued)

FOREIGN PATENT DOCUMENTS

FR 3052551 B1 * 4/2019
GB 2410542 A * 8/2005 ............. F41A 19/68
(Continued)

OTHER PUBLICATIONS

International Search Report and the Written Opinion Dated Mar. 9, 2023 From the International Searching Authority Re. Application No. PCT/TR2022/051265. (9 Pages).

*Primary Examiner* — Benjamin P Lee

(57) ABSTRACT

The present invention relates to a body (2) located in air vehicles; at least one gas discharge element (E) on the body (2), which enables the discharge of hot waste gases; at least one cartridge (F) launched from the body (2) against thermally guided threats directed to the body (2), so that the cartridge (F) is used for defense purposes; a launcher unit (3) located on the body (2) to extend outward from the body (2) and launching a cartridge (F) against thermal threats directed to the body (2), wherein the launcher unit (3) is located on a side of the gas discharge element (E) that discharges hot air; at least one rotation mechanism (4) which is located on the body (2) in a rotatable manner, thus enabling the launcher unit (3) to which it is attached to orient itself towards a thermal target; a casing (5) located to substantially surround the launcher unit (3), serving as a casing for the launcher unit (3), connected to the rotation mechanism (4), and transferring movements of the rotation mechanism (4) to the launcher unit (3) and protecting the launcher unit (3) from external factors.

9 Claims, 2 Drawing Sheets

(58) Field of Classification Search
CPC ... F42B 5/155; B64D 1/02; B64D 7/00; F41F 7/00; F41H 11/02
See application file for complete search history.

(56) References Cited

U.S. PATENT DOCUMENTS

| | | |
|---|---|---|
| 9,932,900 B2 | 4/2018 | Sommerer et al. |
| 11,685,526 B2 * | 6/2023 | Zätterqvist ............... B64D 1/02 89/1.59 |
| 2010/0326262 A1 | 12/2010 | Galanti et al. |
| 2019/0137220 A1 * | 5/2019 | Zaetterqvist ............ G01S 13/87 |
| 2019/0193857 A1 * | 6/2019 | Zätterqvist ............... B64D 7/00 |
| 2020/0124385 A1 * | 4/2020 | Mercier .................. F42B 12/22 |
| 2022/0234735 A1 * | 7/2022 | Zätterqvist ............... B64D 1/02 |
| 2023/0031637 A1 * | 2/2023 | Milliorn, Jr. .............. F42B 5/15 |

FOREIGN PATENT DOCUMENTS

| | | | |
|---|---|---|---|
| JP | 2005172363 A * | 6/2005 | ............. F42B 12/70 |
| TR | 200708404 | 6/2009 | |
| WO | WO 2013/130518 | 9/2013 | |
| WO | WO 2020/246931 | 12/2020 | |
| WO | WO 2021/040653 | 3/2021 | |
| WO | WO-2021040653 A1 * | 3/2021 | ............... B64D 1/02 |

* cited by examiner

SHIELDING CASE FOR A ROTARY FLARE DISPENSING SYSTEM

RELATED APPLICATIONS

This application is a National Phase of PCT Patent Application No. PCT/TR2022/051265 having International filing date of Nov. 9, 2022, which claims the benefit of priority of Turkey Patent Application No. 2021/021202 filed on Dec. 27, 2021. The contents of the above applications are all incorporated by reference as if fully set forth herein in their entirety.

The present invention relates to a heat shield system which protects flare systems located at an exhaust outlet of helicopters from hot exhaust gases.

In helicopters, gases with temperatures as high as 300° C. exhausted from the exhaust during a flight reach a CMDS (Counter Measure Dispenser System) equipment, causing the equipment to exceed an operating temperature of 70° C. and causing the equipment to not operate and be damaged. To solve this problem, a shield is needed to protect the equipment from the heat thereon. The heat shield design is made of a titanium material, which is one of the metal materials with the lowest heat permeability on the outer surface. In addition, an insulation material resistant to combustion and high temperature should be chosen and coated on an inner surface of the titanium heat shield.

The United States patent document U.S. Pat. No. 9,932,900B2, which is included in the known-state of the art, comprises a structure aiming to protect devices in an engine compartment of an air vehicle against high temperatures. The document discloses that geometry of the insulation cage structure is determined according to the geometry of the equipment to be thermally isolated.

The United States patent document U.S. Pat. No. 9,134,098B1, which is included in the known-state of the art, relates to a cartridge launcher system used against rockets threatening an air vehicle. The invention discloses that cartridge launcher systems are positioned inside a protector, which is a launcher unit created to be armored and covered, in order to protect the air vehicle against attacks and bullets. It is disclosed that the covers on the protector aim to protect the cartridge launchers from external influences. It is disclosed that the protective equipment provided to protect launchers can be made of titanium, ceramic composite materials or any material with armor properties.

The United States patent application US20100326262, which is included in the known-state of the art, discloses a casing box which uses radar diversion reflectors with cartridge launcher systems. The invention discloses that the boxes serve as a protective plate and the direction of the shot can be changed by a pilot using a control mechanism located in the middle of the casing boxes.

Thanks to a heat shield system according to the present invention, cartridge launcher systems are enabled to be protected from heat and operate effectively.

SUMMARY OF THE INVENTION

An object of the present invention is to protect CMDS (Counter Measure Dispenser System) equipment used in helicopters from high temperatures.

Another object of the present is to enable effective operation of the CMDS (Counter Measure Dispenser System) equipment in helicopters.

The heat shield system realized to achieve the object of the invention, which is defined in the first claim and other claims dependent thereon, comprises a body in an air vehicle such as a helicopter; at least one gas discharge element which discharges hot waste gases inside the body; at least one cartridge providing defense by eliminating heat-guided threats to the body; a launcher unit located on the body extending outward from the body, so as to be in front of an area where the gas discharge element discharges hot air, wherein the launcher unit launches cartridges against thermal threats directed to the body; at least one rotation mechanism on the body, which enables the launcher unit to orient itself against incoming threats on the body; a casing connected to the rotation mechanism, surrounding the launcher unit, acting as a shield for the launcher unit, transferring a rotational movement of the rotation mechanism to the launcher unit and protecting the launcher unit from environmental factors.

The heat shield system according to the invention comprises at least one protrusion extending, on a face of the launcher unit that launches cartridge, from the casing by making an angle with an axis on which the cartridges are positioned throughout the launcher unit, thus protecting the launcher unit from hot air by striking the hot air coming from the gas discharge element to the protrusion and directing it outwards from the launcher unit.

In an embodiment of the invention, the heat shield system comprises the casing which is shape compatible with the launcher unit and is connected to the rotation mechanism to move together with the launcher unit, wherein the launcher unit is placed in the casing such that the cartridge-launching part of the launcher is exposed.

In an embodiment of the invention, the heat shield system comprises the casing which consists of a first cover located between the rotation mechanism and the launcher unit, with one end connected to the rotation mechanism and the other end to the launcher unit, and a second cover extending from the first cover to surround the launcher unit, thereby enabling ease of assembly for the casing.

In an embodiment of the invention, the heat shield system comprises the curved protrusion which expands outward over the casing in a direction that the cartridges extend longitudinally towards the launcher unit, thus taking the form of a skirt and providing low drag with the sides of the casing.

In an embodiment of the invention, the heat shield system comprises at least one fastener that removably connects the first cover and the second cover.

In an embodiment of the invention, the heat shield system comprises at least one insulating element made of a heat insulating material, located in an inner part of the casing and at a part of the launcher unit inside the casing, thus protecting the launcher unit from heat caused by hot air coming from the gas discharge element.

In an embodiment of the invention, the heat shield system comprises the insulating element that substantially encloses and fills a portion between the launcher unit and the casing where the casing contacts the launcher unit.

In an embodiment of the invention, the heat shield system comprises the rotation mechanism which consists of at least one ball bearing that rotates the launcher unit around its center on the body; at least one support element located on the ball bearing, extending outward from the ball bearing, and connecting the launcher unit and the body; a holder located on the support element to extend outward from the body, and connecting the support element and the launcher unit; at least one hinge which connects the holder to the support element such that the holder is rotatable around the support element, and on which the launcher unit is positioned.

In an embodiment of the invention, the heat shield system comprises the insulating element made of a material such as polyurethane foam, glass wool, cork or aerogel.

In an embodiment of the invention, the heat shield system comprises the casing made of a titanium material resistant to high temperatures.

In an embodiment of the invention, the heat shield system comprises a sensor on the body that detects motion; a control unit which triggers the sensor according to the information received; the rotation mechanism triggered by the sensor to be moved; the launcher unit that fires cartridges when the sensor triggers.

BRIEF DESCRIPTION OF THE SEVERAL VIEWS OF THE DRAWINGS

The heat shield system realized to achieve the object of the present invention is illustrated in the attached drawings, in which.

DESCRIPTION OF SPECIFIC EMBODIMENTS OF THE INVENTION

Figure 1:
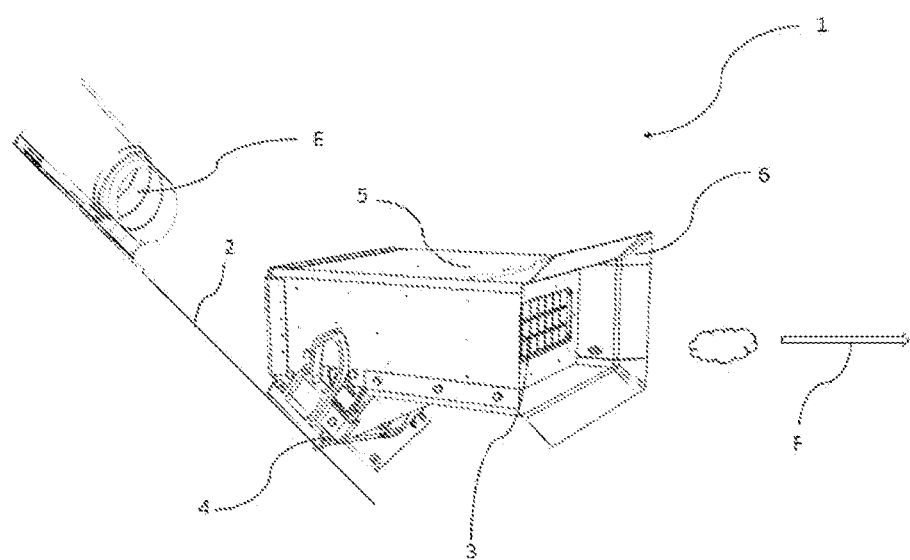
FIG. 1 is a perspective view of a heat shield system.

All the parts illustrated in figures are individually assigned a reference numeral and the corresponding terms of these numbers are listed below:
1. Heat Shield System
2. Body
3. Launcher Unit
4. Rotation Mechanism
401. Ball Bearing
402. Hinge
5. Casing
501. First Cover
502. Second Cover
6. Protrusion
7. Fastener
8. Insulating Element
9. Support element
10. Holder
11. Sensor
12. Control Unit
E. Gas Discharge Element
F. Cartridge A heat shield system (1) comprises a body (2) located in air vehicles; at least one gas discharge element (E) on the body (2), which enables the discharge of hot waste gases; at least one cartridge (F) launched from the body (2) against thermally guided threats directed to the body (2), so that the cartridge (F) is used for defense purposes; a launcher unit (3) located on the body (2) to extend outward from the body (2) and launching a cartridge (F) against thermal threats directed to the body (2), wherein the launcher unit (3) is located on a side of the gas discharge element (E) that discharges hot air; at least one rotation mechanism (4) which is located on the body (2) in a rotatable manner, thus enabling the launcher unit (3) to which it is attached to orient itself towards a thermal target; a casing (5) located to substantially surround the launcher unit (3), serving as a housing for the launcher unit (3), connected to the rotation mechanism (4), and transferring movements of the rotation mechanism (4) to the launcher unit (3) and protecting the launcher unit (3) from external factors.

The heat shield system (1) according to the invention comprises at least one protrusion (6) extending from the casing (5) outwardly from an opening through which the launcher unit (3) fires the cartridge (F), and at an angle to the direction in which the cartridges (F) are positioned along the launcher unit (3), thereby protecting the launcher unit (3) from hot air since the air coming from the gas discharge element (E) is hit against the protrusion (6) and is directed outwards from the launcher unit (3).

A gas discharge element (E) is provided on the body (2) located on the air vehicle, through which the hot waste gases formed during the flight are discharged. At least one cartridge (F), which destroys heat-guided threats towards the body (2), is launched by a launcher unit (3) to eliminate these threats, wherein the launcher unit (3) is located to extend outward from the body (2), in front of an area where the gas discharge element (E) discharges gas. At least one rotation mechanism (4), which is rotatably located on the body (2) and is connected to the launcher unit (3), directs the launcher unit (3) towards the thermal target. In this way, the launcher unit (3) effectively destroys threats. A casing (5) located on the body (2) and connected to the rotation mechanism (4) substantially surrounds the launcher unit (3) to protect the launcher unit (3) from external factors. The casing (5) transfers the rotational movement of the rotation mechanism (4) to the launcher unit (3).

The heat shield system (1) comprises at least one protrusion (6) extending outward from the casing (5) outwardly from an opening through which the launcher unit (3) fires the cartridge (F), and at an angle to the direction along which the cartridges (F) are positioned longitudinally in the launcher unit (3), thereby protecting the launcher unit (3) from hot air since the air coming from the gas discharge element (E) is hit against the protrusion (6) and is directed outwards from the launcher unit (3) (FIG. 1).

In an embodiment of the invention, a heat shield system (1) comprises the casing (5) which is substantially form-fitted with the launcher unit (3) and connected to the rotation mechanism (4) to move together with the launcher unit (3), wherein the launcher unit (3) is placed inside the casing (5) such that the opening of the launcher unit (3) through which it launches cartridge (F) is exposed. The casing (5) has a shape form-fitting with the launcher unit (3). The casing (5) covers the launcher unit (3) such that the surface thereof launching the cartridge (F) is exposed. The casing (5) is connected to the launcher unit (3) so as to transfer rotational movements of the rotation mechanism (4).

Figure 2:
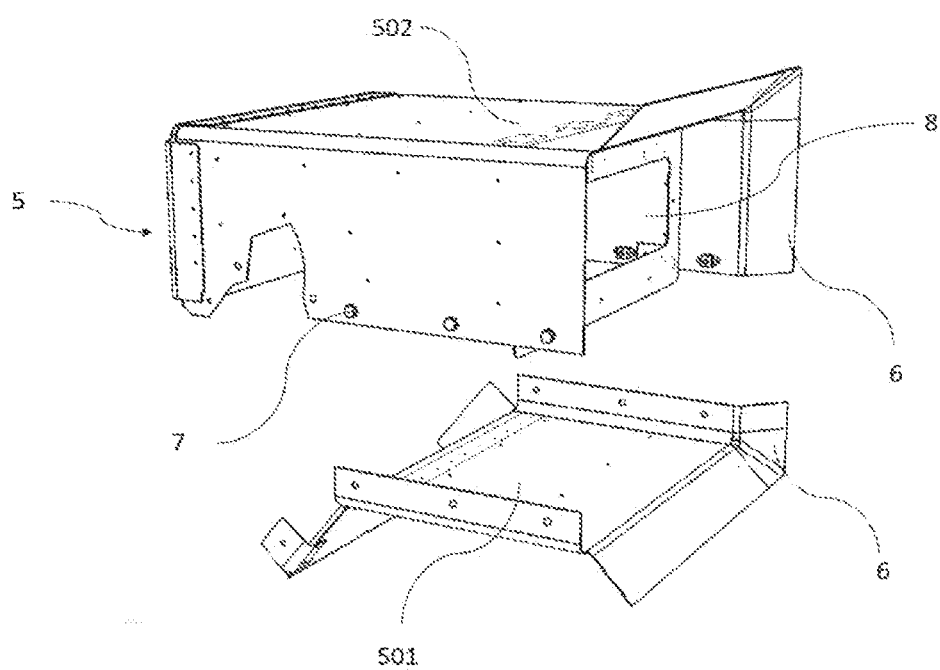
FIG. 2 is a perspective view of a casing.

In an embodiment of the invention, a heat shield system (1) comprises the casing (5) which consists of a first cover (501) located between the rotation mechanism (4) and the launcher unit (3), with one end connected to the rotation mechanism (4) and one end to the launcher unit (3), and a second cover (502) extending outwardly from the first cover (501) so as to substantially surround the launcher unit (3), thereby enabling ease of assembly for the casing (5). The casing (5) consists of a first cover (501) and a second cover (502). The first cover (501) is located between the launcher unit (3) and the rotation mechanism (4). The second cover (502) surrounds the launcher unit (3) and extends outward from the first cover (501). In this way, ease of assembly and service is provided for the casing (5) (FIG. 2).

In an embodiment of the invention, a heat shield system (1) comprises the protrusion (6) extending outward in the form of a skirt such that it expands from the direction where the cartridges (F) are positioned along the launcher unit (3) in the casing (5), and having a curved transition to form an effective aerodynamic structure with the sides of the casing (5). The protrusion (6) extending outward from the casing (5) forms an angle with the extension where the cartridges (F) are placed throughout the launcher unit (3), and extends in the form of a skirt, forming a curved structure. In addition, the protrusion (6) creates an effective aerodynamic structure. Therefore, hot gases from the gas discharge element (E) are prevented from affecting the launcher unit (3), thus ensuring the effective operation of the launcher unit (3).

In an embodiment of the invention, a heat shield system (1) comprises at least one fastener (7) that enables the first cover (501) and the second cover (502) to be mounted removably to each other. It comprises a fastener (7) which assembles the first cover (501) and the second cover (502) to each other. In this way, ease of assembly is provided for the casing (5).

In an embodiment of the invention, a heat shield system (1) comprises at least one insulating element (8) located substantially within an inner wall of the casing (5) and a part of the launcher unit (3) that is provided in the casing (5), wherein the insulating element (8) is made of a heat insulating material, thus protecting the launcher unit (3) from heat caused by hot air coming from the gas discharge element (E). Inside the casing (5), there is at least one insulating element (8) made of a heat insulating material and surrounding the launcher unit (3). Therefore, the launcher unit (3) is protected from hot gases coming from the gas discharge element (E).

In an embodiment of the invention, a heat shield system (1) comprises the insulating element (8) that substantially covers an area between the launcher unit (3) and the casing (5).

Figure 3:
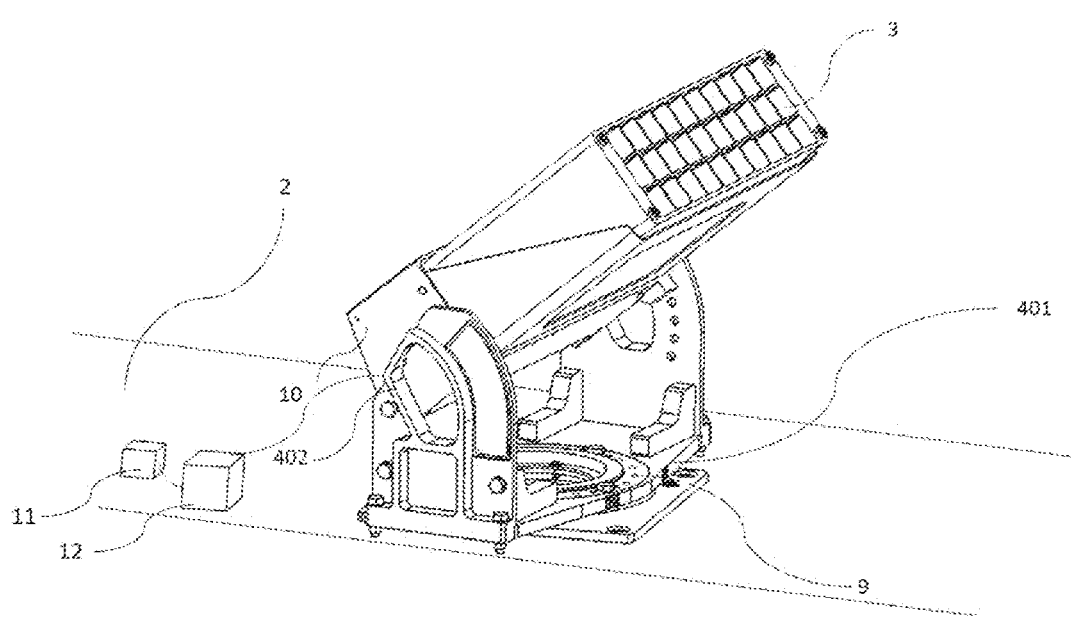
FIG. 3 is a perspective view of a heat shield system.

In an embodiment of the invention, a heat shield system (1) comprises the rotation mechanism (4) which consists of at least one ball bearing (401) which enables the launcher unit (3) to be rotated around its own center on the body (2); at least one support element (9) located on the ball bearing (401), extending outward from the ball bearing (401), and connecting the launcher unit (3) to the body (2); a holder (10) located on the support element (9) to extend outward from the body (2), and connecting the support element (9) and the launcher unit (3) to each other; at least one hinge (402) which connects the holder (10) to the support element (9) such that the holder (10) is rotatable around the support element (9), and which enables the launcher unit (3) to be positioned. Therefore, the launcher unit (3) can be activated (FIG. 3).

In an embodiment of the invention, a heat shield system (1) comprises the insulating element (8) made of materials such as polyurethane foam, glass wool, cork or aerogel.

In an embodiment of the invention, a heat shield system (1) comprises the casing (5) made of a titanium material resistant to high temperatures.

In an embodiment of the invention, a heat shield system (1) comprises a sensor (11) on the body (2) that detects motion; a control unit (12) which triggers the sensor (11); the rotation mechanism (4) triggered by the sensor (11) to move; the launcher unit (3) triggered by the sensor (11) to fire cartridges (F). The sensor (11) on the body (2) detects the movement and is triggered by the control unit (12). The sensor (11) triggers the rotation mechanism (4) to activate the launcher unit (3).

The invention claimed is:

1. A shielding case for a rotary flare dispensing system comprising a body located in air vehicles; at least one gas discharge element (E) on the body, which enables the discharge of exhaust gases; at least one cartridge (F) launched from the body against thermally guided threats directed to the body, so that the cartridge (F) is used for defense purposes; a launcher unit located on the body to extend outward from the body and launching a cartridge (F) against thermal threats directed to the body, wherein the launcher unit is located on a side of the gas discharge element (E) that discharges exhaust gases; at least one rotation mechanism which is located on the body in a rotatable manner, thus enabling the launcher unit to which it is attached to orient itself towards a thermal target; a casing located on and surrounding the launcher unit, connected to the rotation mechanism, and transferring movements of the rotation mechanism to the launcher unit and protecting the launcher unit from exhaust gases, characterized by at least one protrusion extending from the casing outwardly from an opening through which the launcher unit fires the cartridge (F), and at an angle to the direction in which the cartridges (F) are positioned along the launcher unit, thereby protecting the launcher unit from exhaust gases by deflecting the exhaust gases coming from the gas discharge element (E) that strike the protrusion and are directed outwards from the launcher unit.

2. A shielding case for a rotary flare dispensing system according to claim 1, wherein the casing is form-fitted with the launcher unit and connected to the rotation mechanism to move together with the launcher unit, and the launcher unit is placed inside the casing such that the opening of the launcher unit through which it launches cartridge (F) is exposed.

3. A shielding case for a rotary flare dispensing system according to claim 1, wherein the casing consists of a first cover located between the rotation mechanism and the launcher unit, with one end connected to the rotation mechanism and one end to the launcher unit, and a second cover extending outwardly from the first cover so as to surround the launcher unit, thereby enabling ease of assembly for the casing.

4. A shielding case for a rotary flare dispensing system according to claim 1, wherein the protrusion extending outward in the form of a skirt such that it expands at an angle from the direction where the cartridges (F) are positioned along the launcher unit in the casing, and having a curved transition to form an effective aerodynamic structure with the sides of the casing.

5. A shielding case for a rotary flare dispensing system according to claim 3, comprising at least one fastener that enables the first cover and the second cover to be mounted removably to each other.

6. A shielding case for a rotary flare dispensing system according to claim 1, wherein at least one insulating element is located between an inner wall of the casing and a part of the launcher unit that is provided in the casing, wherein the insulating element is made of a heat insulating material, thus protecting the launcher unit from heat caused by exhaust gases coming from the gas discharge element (E).

7. A shielding case for a rotary flare dispensing system according to claim 6, wherein the insulating element covers an area between the launcher unit and the casing.

8. A shielding case for a rotary flare dispensing system according to claim 6, wherein the insulating element is made of polyurethane foam, glass wool, cork or aerogel.

9. A shielding case for a rotary flare dispensing system according to claim 1, wherein the casing is made of a titanium material resistant to high temperatures.

* * * * *